US012695158B2

(12) United States Patent
Villaluenga et al.

(10) Patent No.: US 12,695,158 B2
(45) Date of Patent: Jul. 28, 2026

(54) BINDERS FOR COMPOSITE ELECTROLYTES

(71) Applicant: Blue Current, Inc., Hayward, CA (US)

(72) Inventors: Irune Villaluenga, Berkeley, CA (US); Joanna Burdynska, Berkeley, CA (US); Kevin Wujcik, Berkeley, CA (US)

(73) Assignee: Blue Current, Inc., Hayward, CA (US)

( * ) Notice: Subject to any disclaimer, the term of this patent is extended or adjusted under 35 U.S.C. 154(b) by 0 days.

(21) Appl. No.: 18/951,559

(22) Filed: Nov. 18, 2024

(65) Prior Publication Data

US 2025/0192374 A1    Jun. 12, 2025

Related U.S. Application Data

(63) Continuation of application No. 17/304,645, filed on Jun. 23, 2021, now Pat. No. 12,166,239, which is a
(Continued)

(51) Int. Cl.
*H01B 1/22*     (2006.01)
*H01M 10/0525*     (2010.01)
(Continued)

(52) U.S. Cl.
CPC ............ *H01M 50/497* (2021.01); *H01B 1/22* (2013.01); *H01M 10/0525* (2013.01); *H01M 50/414* (2021.01); *H01M 50/431* (2021.01)

(58) Field of Classification Search
CPC .. H01B 1/00; H01B 1/22; H01B 1/24; H01M 4/36; H01M 4/0525; H01M 4/58; H01M 4/5815; H01M 4/622; H01M 50/497
See application file for complete search history.

(56) References Cited

U.S. PATENT DOCUMENTS 9,786,890 B2    10/2017    Cho et al.
12,018,131 B2    6/2024    Burdynska et al.
(Continued)

FOREIGN PATENT DOCUMENTS

CN    107710455 A    2/2018
CN    109786845 A    5/2019
(Continued)

OTHER PUBLICATIONS

CN Office Action and Search Report dated May 21, 2025 in CN Application No. 202180038240.9, with English Translation.
(Continued)

*Primary Examiner* — Mark Kopec
(74) *Attorney, Agent, or Firm* — Weaver Austin Villeneuve & Sampson LLP

(57) ABSTRACT

Provided herein are composite electrolytes that include inorganic conductors and polar polymers. By providing the polar polymers as structures such as microspheres in a suspension in a non-polar solvent, the polar polymers can be used as binders in composites that include sulfide electrolytes. The resulting composites have high room temperature conductivities and good mechanical properties. Also provided are composites that include inorganic conductors and other polymers that are insoluble in non-polar solvents. Also provided are composites that include polar polymers and lithium argyrodite conductors and methods of processing the composites that result in high conductivity retention. Also provided are methods of forming composite electrolytes using suspensions of polymer microstructures in a processing solvent and the resulting composite electrolytes.

10 Claims, 3 Drawing Sheets

Non-polar polymer

Sulfide particles

Polar polymer

Related U.S. Application Data continuation-in-part of application No. 17/129,290, filed on Dec. 21, 2020, now Pat. No. 11,667,772, said application No. 17/304,645 is a continuation-in-part of application No. 16/814,756, filed on Mar. 10, 2020, now Pat. No. 11,394,054.

(60) Provisional application No. 62/952,111, filed on Dec. 20, 2019, provisional application No. 62/952,060, filed on Dec. 20, 2019.

(51) Int. Cl.

| | |
|---|---|
| *H01M 50/414* | (2021.01) |
| *H01M 50/431* | (2021.01) |
| *H01M 50/497* | (2021.01) |

(56) References Cited

U.S. PATENT DOCUMENTS

| | | | | |
|---|---|---|---|---|
| 12,166,239 | B2 * | 12/2024 | Villaluenga | H01M 50/446 |
| 12,355,075 | B2 | 7/2025 | Teran et al. | |
| 2002/0195591 | A1 | 12/2002 | Ravet et al. | |
| 2007/0037060 | A1 | 2/2007 | Lee et al. | |
| 2013/0273419 | A1 | 10/2013 | Pistorino et al. | |
| 2014/0162138 | A1 | 6/2014 | Fujiki et al. | |
| 2014/0162139 | A1 | 6/2014 | Hoshiba et al. | |
| 2015/0147660 | A1 * | 5/2015 | Fujiki | H01M 4/62 |
| | | | | 29/623.5 |
| 2015/0155546 | A1 | 6/2015 | Yushin et al. | |
| 2016/0226097 | A1 * | 8/2016 | Wegner | H01M 10/052 |
| 2016/0248120 | A1 | 8/2016 | Yamada et al. | |
| 2017/0125842 | A1 | 5/2017 | Meguro et al. | |
| 2018/0083303 | A1 | 3/2018 | Platt et al. | |
| 2019/0148765 | A1 | 5/2019 | Otaki et al. | |
| 2019/0334174 | A1 | 10/2019 | Hasegawa et al. | |
| 2020/0099089 | A1 | 3/2020 | Mimura et al. | |
| 2020/0152960 | A1 | 5/2020 | Grunwald et al. | |
| 2020/0303765 | A1 | 9/2020 | Takami et al. | |
| 2020/0303772 | A1 | 9/2020 | Makino et al. | |
| 2020/0365944 | A1 | 11/2020 | Yang et al. | |
| 2021/0184252 | A1 | 6/2021 | Yawata et al. | |
| 2022/0021079 | A1 | 1/2022 | Villaluenga et al. | |
| 2022/0069338 | A1 | 3/2022 | Lee et al. | |
| 2022/0115645 | A1 | 4/2022 | Adireddy et al. | |
| 2022/0255150 | A1 | 8/2022 | Kim et al. | |
| 2024/0283041 | A1 | 8/2024 | Wujcik et al. | |
| 2024/0301145 | A1 | 9/2024 | Burdynska et al. | |
| 2025/0105346 | A1 | 3/2025 | Burdynska et al. | |

FOREIGN PATENT DOCUMENTS

| | | | |
|---|---|---|---|
| CN | 109962288 A | 7/2019 | |
| CN | 110663085 A | 1/2020 | |
| CN | 110914940 A | 3/2020 | |
| DE | 102015224345 A1 | 6/2017 | |
| JP | H0689705 A | 3/1994 | |
| JP | 2001291529 A | 10/2001 | |
| JP | 2016033917 A | 3/2016 | |
| JP | 2019526893 A | 9/2019 | |
| JP | 2020509132 A | 3/2020 | |
| KR | 19990025432 A | 4/1999 | |
| KR | 20180021797 A | 3/2018 | |
| WO | WO-2017093107 A1 | 6/2017 | |
| WO | WO-2019017310 A1 | 1/2019 | |

OTHER PUBLICATIONS

CN Office Action dated Dec. 25, 2025 in CN Application No. 202080095627.3, with English Translation.
CN Office Action dated Feb. 27, 2025 in CN Application No. 202080095627.3, with English Translation.
EP Extended European Search report dated Jul. 16, 2024 in EP Application No. 20901183.2.
EP Extended European Search Report dated May 22, 2025 in EP Application No. 21780763.5.
EP Extended European Search report dated Oct. 10, 2025 in EP Application No. 22799446.4.
JP Office Action dated Jul. 22, 2025 in JP Application No. 2022-536988, with English Translation.
JP Office Action dated May 7, 2025 in JP Application No. 2022-560397, with English Translation.
JP Office Action dated Nov. 12, 2024 in JP Application No. 2022-536988 with English translation.
KR Office Action dated Aug. 7, 2025 in KR Application No. 10-2022-7025015, with English Translation.
KR Office Action dated Sep. 24, 2025 in KR Application No. 10-2022-7038846, with English Translation.
Patel A.M., et al., "Synthesis, Characterization and Material Application of Poly(Urea-Imide)s, Part 1," International Journal of Polymeric Materials, 2010, vol. 59, pp. 98-108.
U.S. Advisory Action dated May 9, 2025 in U.S. Appl. No. 18/155,560.
U.S. Final Office Action dated Feb. 5, 2025 in U.S. Appl. No. 18/155,560.
U.S. Final Office Action dated Jul. 25, 2024 in U.S. Appl. No. 17/735,954.
U.S. Final Office Action dated Jun. 25, 2025 in U.S. Appl. No. 17/735,954.
U.S. Final Office Action dated Mar. 26, 2025 in U.S. Appl. No. 17/301,457.
U.S. Non-Final Office Action dated Aug. 1, 2024 in U.S. Appl. No. 17/661,898.
US Non-Final Office Action dated Aug. 13, 2025 in U.S. Appl. No. 18/155,560.
U.S. Non-Final Office Action dated Aug. 26, 2024 in U.S. Appl. No. 18/655,112.
U.S. Non-Final Office Action dated Dec. 18, 2024 in U.S. Appl. No. 17/735,954.
U.S. Non-Final Office Action dated Jul. 11, 2024 in U.S. Appl. No. 17/301,457.
U.S. Non-Final Office Action dated Jun. 26, 2025 in U.S. Appl. No. 18/667,185.
US Non-Final Office Action dated May 2, 2025 in U.S. Appl. No. 17/735,961.
U.S. Non-Final Office Action dated Nov. 18, 2025 in U.S. Appl. No. 17/301,457.
U.S. Notice of Allowance dated Mar. 4, 2025 in U.S. Appl. No. 17/661,898.
U.S. Appl. No. 19/238,135, inventors Teran A et al., filed Jun. 13, 2025.
U.S. Appl. No. 19/376,759, inventors Wujcik K et al., filed Oct. 31, 2025.
U.S. Restriction Requirement dated Apr. 10, 2025 in U.S. Appl. No. 18/667,185.
Zhou J., et al., "Impacts of Anion-exchange-membranes With Various Ionic Exchange Capacities on the Performance of $H_2/O_2$ Fuel Cells," Journal of Power Sources, 2012, vol. 219, pp. 272-279.

* cited by examiner

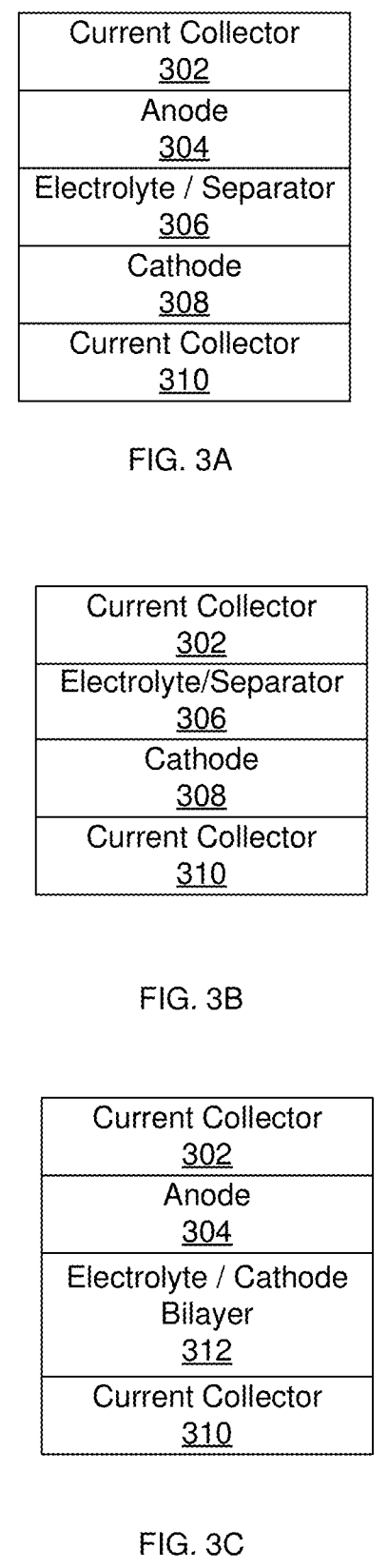

| Current Collector 302 |
|---|
| Anode 304 |
| Electrolyte / Separator 306 |
| Cathode 308 |
| Current Collector 310 |

FIG. 3A

| Current Collector 302 |
|---|
| Electrolyte/Separator 306 |
| Cathode 308 |
| Current Collector 310 |

FIG. 3B

| Current Collector 302 |
|---|
| Anode 304 |
| Electrolyte / Cathode Bilayer 312 |
| Current Collector 310 |

FIG. 3C

BINDERS FOR COMPOSITE ELECTROLYTES

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

Solid-state electrolytes present various advantages over liquid electrolytes for primary and secondary batteries. For example, in lithium ion secondary batteries, inorganic solid-state electrolytes may be less flammable than conventional liquid organic electrolytes. Solid-state electrolytes can also facilitate use of a lithium metal electrode by resisting dendrite formation. Solid-state electrolytes may also present advantages of high energy densities, good cycling stabilities, and electrochemical stabilities over a range of conditions. However, there are various challenges in large scale commercialization of solid-state electrolytes. One challenge is maintaining contact between electrolyte and the electrodes. For example, while inorganic materials such as inorganic sulfide glasses and ceramics have high ionic conductivities (over $10^{-4}$ S/cm) at room temperature, they do not serve as efficient electrolytes due to poor adhesion to the electrode during battery cycling. Another challenge is that glass and ceramic solid-state conductors are too brittle to be processed into dense, thin films on a large scale. This can result in high bulk electrolyte resistance due to the films being too thick, as well as dendrite formation, due to the presence of voids that allow dendrite penetration. The mechanical properties of even relatively ductile sulfide glasses are not adequate to process the glasses into dense, thin films. Improving these mechanical properties without sacrificing ionic conductivity is a particular challenge, as techniques to improve adhesion, such as the addition of a solid polymer binder, tend to reduce ionic conductivity. It is not uncommon to observe more than an order of magnitude conductivity decrease with as little as 1 wt % of binder introduced. Solid-state polymer electrolyte systems may have improved mechanical characteristics that facilitate adhesion and formation into thin films, but have low ionic conductivity at room temperature or poor mechanical strength.

Materials that have high ionic conductivities at room temperature and that are sufficiently compliant to be processed into thin, dense films without sacrificing ionic conductivity are needed for large scale production and commercialization of solid-state batteries.

SUMMARY

One aspect of the disclosure relates to a composite including ionically conductive sulfidic particles and a polymer binder including a first polymer and a second polymer, wherein the first polymer is insoluble in a non-polar solvent, the second polymer is soluble in the non-polar solvent, and the first polymer has a melting temperature ($T_m$) or a glass transition temperature ($T_g$) greater than a $T_m$ or $T_g$ of the second polymer. In some embodiments, the weight percent of the first polymer in the composite is greater that the weight percent of the second polymer in the composite. AVE, the non-polar solvent has a polarity index of less than 3.5, 3.0, 2.5, 2.0, 1.5, 1.0, or 0.5. In some embodiments, the ionically conductive sulfidic particles are glass or glass ceramic particles. In some embodiments, the ionically conductive sulfidic particles are argyrodites.

In some embodiments, the weight percent of the polymer binder in the composite is between 2.5% and 60%, between 5% and 60%, between 10% and 50%, or between 15% and 45%. In some such embodiments, the balance of the composite consists essentially of the ionically conductive sulfidic particles. In some embodiments, the polymer binder is mostly or consists essentially of the first polymer and the second polymer.

In some embodiments, the second polymer is one of: styrene-butadiene-styrene (SBS), styrene-isoprene-styrene (SIS), styrene-ethylene/propylene-styrene (SEPS), styrene-ethylene-butylene-styrene (SEBS), styrene butadiene rubber (SBR), ethylene propylene diene monomer (EPDM) rubber, and polybutadiene (PBD), polyisoprene (PI), and polystyrene (PS).

In some embodiments, the first polymer is one of a polyester, poly (vinyl chloride) (PVC), poly (methyl methacrylate) (PMMA), cellulose acetate (CA), polyvinylidene fluoride (PVDF), polyethylene oxide (PEO), polypropylene oxide (PPO), polysulfone (PSU), polyurethane (PU), polyethersulfone (PES), polyetherimide (PEI), acrylonitrile butadiene styrene (ABS), polycarbonate (PC), poly (vinyl acetate-co-ethylene) (PVAE), poly (vinyl alcohol) (PVA), nitrile butadiene rubber (NBR), polyacrylonitrile (PAN), polypropylene (PP), polyethylene (PE), polytetrafluoroethylene (PTFE), and polyphenylene sulfide (PPS).

In some embodiments, the composite is a separator in a battery.

Another aspect of the disclosure relates to a composite including ionically conductive sulfidic particles and organic material including a first polymer and a second polymer, wherein the first polymer is soluble in a non-polar solvent and the second polymer is insoluble in the non-polar solvent and the weight percent of the second polymer in the composite is greater that the weight percent of the first polymer in the composite. In some embodiments, the first polymer has a melting temperature (Tm) or a glass transition temperature (Tg) greater than a Tm or Tg of the second polymer.

In some embodiments, the first polymer is the form of microstructures and the ionically conductive sulfidic particles and the microstructures are in a film of the second polymer. In some embodiments, the first polymer has a melting temperature (Tm) or a glass transition temperature (Tg) less than a Tm or Tg of the second polymer. In some embodiments, the first polymer is non-polar.

In some embodiments, the non-polar solvent has a polarity index of less than 3.5, 3.0, 2.5, 2.0, 1.5, 1.0, or 0.5. In some embodiments, the ionically conductive sulfidic particles are glass or glass ceramic particles. In some embodiments, the ionically conductive sulfidic particles are argyrodites. In some embodiments, the weight percent of the organic material in the composite is between 2.5% and 60%, between 5% and 60%, between 10% and 50%, and between 15% and 45%. In some embodiments, the balance of the composite consists essentially of the ionically conductive sulfidic particles. In some embodiments, the organic material is mostly or consists essentially of the first polymer and the second polymer.

In some embodiments, the second polymer is one of: styrene-butadiene-styrene (SBS), styrene-isoprene-styrene (SIS), styrene-ethylene/propylene-styrene (SEPS), styrene-ethylene-butylene-styrene (SEBS), styrene butadiene rubber (SBR), ethylene propylene diene monomer (EPDM) rubber, and polybutadiene (PBD), polyisoprene (PI), and polystyrene (PS).

In some embodiments, first polymer is one of a polyester, poly (vinyl chloride) (PVC), poly (methyl methacrylate) (PMMA), cellulose acetate (CA), polyvinylidene fluoride (PVDF), polyethylene oxide (PEO), polypropylene oxide (PPO), polysulfone (PSU), polyurethane (PU), polyethersulfone (PES), polyetherimide (PEI), acrylonitrile butadiene styrene (ABS), polycarbonate (PC), poly (vinyl acetate-co-ethylene) (PVAE), poly (vinyl alcohol) (PVA), nitrile butadiene rubber (NBR), polyacrylonitrile (PAN), polypropylene (PP), polyethylene (PE), polytetrafluoroethylene (PTFE), and polyphenylene sulfide (PPS).

Another aspect of the disclosure relates electrode composition including a composite as described herein and an electrochemically active material. In some embodiments, the electrode active material includes a transition metal oxide active material. In some embodiments, the electrode active material includes silicon-containing active material. In some embodiments, the electrode active material includes a graphitic active material.

Another aspect of the disclosure relates to a suspension slurry including a solvent; polymer microstructures suspended in the solvent; and ionically conductive sulfidic particles suspended in the solvent. In some embodiments, the suspension slurry further includes a non-polar polymer dissolved in the solvent.

In some such embodiments, the polymer of the polymer microstructures has a melting temperature (Tm) or a glass transition temperature (Tg) greater than a Tm or Tg of the non-polar polymer. In some such embodiments, the weight percent of the polymer microstructures in the suspension slurry is greater than the weight percent of the non-polar polymer in the suspension slurry. In some embodiments, the suspension slurry further includes a slurry stabilizer. In some embodiments, the solvent has a polarity index of less than 3.5, 3.0, 2.5, 2.0, 1.5, 1.0, or 0.5. In some embodiments, the ionically conductive sulfidic particles are glass or glass ceramic particles.

In some embodiments, the ionically conductive sulfidic particles are argyrodites. In some embodiments, the weight percent of (polymer)/(polymer+ionically conductive sulfidic particles) is between 2.5% and 60%, between 5% and 60%, between 10% and 50%, and between 15% and 45%.

In some embodiments, the polymer microstructures is one of a polyester, poly(vinyl chloride) (PVC), poly(methyl methacrylate) (PMMA), cellulose acetate (CA), polyvinylidene fluoride (PVDF), polyethylene oxide (PEO), polypropylene oxide (PPO), polysulfone (PSU), polyurethane (PU), polyethersulfone (PES), polyetherimide (PEI), acrylonitrile butadiene styrene (ABS), polycarbonate (PC), poly (vinyl acetate-co-ethylene) (PVAE), poly(vinyl alcohol) (PVA), nitrile butadiene rubber (NBR), polyacrylonitrile (PAN), polypropylene (PP), polyethylene (PE), polytetrafluoroethylene (PTFE), and polyphenylene sulfide (PPS).

In some embodiments, the non-polar polymer is one of: styrene-butadiene-styrene (SBS), styrene-isoprene-styrene (SIS), styrene-ethylene/propylene-styrene (SEPS), styrene-ethylene-butylene-styrene (SEBS), styrene butadiene rubber (SBR), ethylene propylene diene monomer (EPDM) rubber, and polybutadiene (PBD), polyisoprene (PI), and polystyrene (PS). In some embodiments, the suspension slurry further including an electrode active material. In some embodiments, the composite is a separator in a battery.

Another aspect of the disclosure relates to a solution including a solvent, polymer microstructures suspended in the solvent, and a non-polar polymer dissolved in the solvent. In some embodiments, the polymer of the polymer microstructures has a melting temperature (Tm) or a glass transition temperature (Tg) greater than a Tm or Tg of the non-polar polymer. In some embodiments, the weight percent of the polymer microstructures in the solution is greater than the weight percent of the non-polar polymer in the solution.

In some embodiments, the solution further includes a slurry stabilizer. In some embodiments, the solvent has a polarity index of less than 3.5, 3.0, 2.5, 2.0, 1.5, 1.0, or 0.5.

In some embodiments, the polymer microstructures are one of a polyester, poly(vinyl chloride) (PVC), poly(methyl methacrylate) (PMMA), cellulose acetate (CA), polyvinylidene fluoride (PVDF), polyethylene oxide (PEO), polypropylene oxide (PPO), polysulfone (PSU), polyurethane (PU), polyethersulfone (PES), polyetherimide (PEI), acrylonitrile butadiene styrene (ABS), polycarbonate (PC), poly (vinyl acetate-co-ethylene) (PVAE), poly(vinyl alcohol) (PVA), nitrile butadiene rubber (NBR), polyacrylonitrile (PAN), polypropylene (PP), polyethylene (PE), polytetrafluoroethylene (PTFE), and polyphenylene sulfide (PPS).

In some embodiments, the non-polar polymer is one of: styrene-butadiene-styrene (SBS), styrene-isoprene-styrene (SIS), styrene-ethylene/propylene-styrene (SEPS), styrene-ethylene-butylene-styrene (SEBS), styrene butadiene rubber (SBR), ethylene propylene diene monomer (EPDM) rubber, and polybutadiene (PBD), polyisoprene (PI), and polystyrene (PS).

Another aspect of the disclosure relates to a method involving providing a suspension comprising a solvent, microstructures of a first polymer suspended in the solvent, ionically conductive sulfidic particles suspended in the solvent, and a second polymer dissolved in the solvent; removing the solvent to form a composite; and heating the composite to melt the microstructures.

Another aspect of the disclosure is a composite including ionically conductive lithium argyrodite particles and a polymer binder comprising a first polymer and a second polymer, wherein the first polymer is insoluble in a non-polar solvent, the second polymer is soluble in the non-polar solvent, and the first polymer has a melting temperature ($T_m$) or a glass transition temperature ($T_g$) greater than a $T_m$ or $T_g$ of the second polymer, and wherein the composite has an ionic conductivity of at least 0.3 mS/cm.

Another aspect of the disclosure is a composite

These and other aspects are described further below with reference to the drawings.

BRIEF DESCRIPTION OF DRAWINGS

FIGS. 3A-3C show schematics of examples of cells including composites described herein according to certain embodiments.

DESCRIPTION

Figure 1:
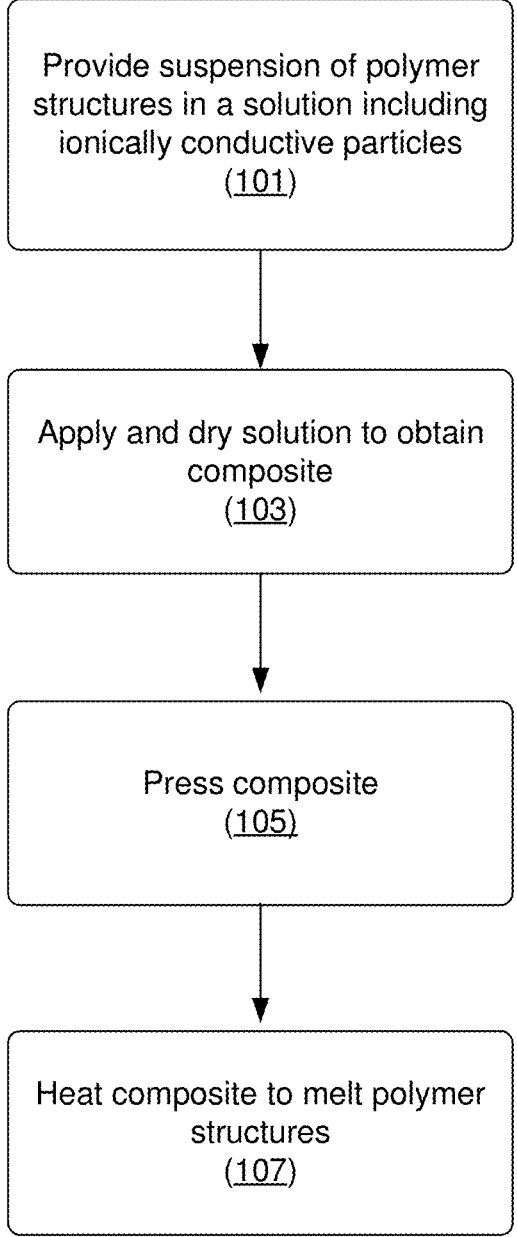
FIG. 1 is a flow diagram showing operations in a method of forming a composite electrolyte according to certain embodiments.

Provided herein are ionically conductive composite electrolytes that have an ionically-conductive inorganic phase and an organic phase. The composites are single-ion conductors with good electrochemical stability and room temperature conductivities. The organic phase includes a polymeric binder that provides sufficient mechanical properties that enable processing and incorporation in all-solid-state batteries. The composite electrolytes can also provide high elasticity, bendability, and mechanical strength that may be needed for devices such as flexible electronics that are exposed to significant stresses during operation.

The term "number average molecular weight" or "Mn" in reference to a particular component (e.g., a high molecular weight polymer binder) of a solid-state composition refers to the statistical average molecular weight of all molecules of the component expressed in units of g/mol. The number average molecular weight may be determined by techniques known in the art such as, for example, gel permeation chromatography (wherein Mn can be calculated based on known standards based on an online detection system such as a refractive index, ultraviolet, or other detector), viscometry, mass spectrometry, or colligative methods (e.g., vapor pressure osmometry, end-group determination, or proton NMR). The number average molecular weight is defined by the equation below, $$M_n = \frac{\sum N_i M_i}{\sum N_i}$$

wherein Mi is the molecular weight of a molecule and Ni is the number of molecules of that molecular weight. In the description below, references to molecular weights of particular polymers refer to number average molecular weight.

The term microstructure is used to refer to structures having at least one dimension less than 1000 microns. The microstructures described herein typically have all dimensions less than 100 microns, or less than 10 microns, and in some embodiments less than 5 microns. In many embodiments, the microstructures are nominally spherical and are referred to as microspheres, which include spheres with microscale or nanoscale dimensions. The microstructures may be in the form of sheets or fibers, in which case one dimension (e.g., thickness) may be significantly smaller than one or more other dimensions (e.g., length and/width) to allow for incorporation into thin films of composite material. In some embodiments, two or more dimensions, or all of the dimensions of the microstructure disclosed herein may be microscale and/or nanoscale. In some implementations, the microstructures may include structures including a microscale dimension and nanoscale dimension. As used herein microscale refers to dimensions between 1 micron and 1000 microns, with nanoscale referring to sub-micron dimensions greater than or equal to 1 nanometer.

Introduction

Ionically conductive composite electrolytes that have an ionically-conductive inorganic phase and a non-ionically-conductive organic phase address various challenges of fabricating and using solid state electrolytes. Embodiments of the composite electrolytes have relative high polymer loadings (e.g., about 50 vol. %). This can permit use in flexible electronics and provide good mechanical properties.

Most state-of-the-art composite electrolytes with high organic content rely on ionically conductive polymer matrix rather than inorganic conductors. Typical polymer electrolytes are prepared by dissolving inorganic salt in a polymer matrix, which produces non-single-ion conductors with relatively low ionic conductivities and transference numbers, and that require elevated temperatures for proper operation. In addition, they tend to have poor oxidative stability and decompose during cell operation, leading to inefficiencies in cycling performance and lowered cell life-time. However, mechanical properties of polymers enable easy processing, good interfacial contact with electrodes and flexibility for proper handling and operation of solid-state batteries. Polymer electrolytes can be prepared as composites, with either ionically-conductive or non-conductive inorganic fillers, that can improve both their mechanical and electrochemical properties. Nonetheless, even with addition of inorganic particles, polymer electrolytes still suffer from stability issues and non-single-ion transfer properties.

Polar polymeric binders that are used in other battery applications, such as carboxymethyl cellulose (CMC), polyethylene oxide (PEO), and polyvinylidene fluoride (PVDF), lead to composites having poor ionic conductivity if mixed with certain inorganic conductors. This is because the polymers can bind strongly to surface of inorganic particles, forming a dense, insulating coating that prevents direct contact with neighboring particles. Even as low as 1-5 wt. % of such polymers can insulate particles and block lithium-ion pathways across the composite, leading to very resistive materials. In addition, glassy sulfide conductors are prone to crystallization in presence of polar polymers, which causes an order or two magnitude drop of ionic conductivities.

Another challenge of composite electrolytes is the instability of sulfidic materials in composite electrolytes in moderately polar and very polar solvents. This limits the use of polymers that are insoluble in non-polar solvents with sulfide electrolytes. For example, because polar solvents are used to dissolve polar polymers, the use of polar polymers with sulfidic conductors is challenging.

Provided herein are composite electrolytes that include inorganic conductors and polar polymers. By providing the polar polymers as structures such as microspheres in a suspension in a non-polar solvent, the polar polymers can be used as binders in composites that include sulfide electrolytes. The resulting composites have high room temperature conductivities and good mechanical properties. Also provided are composites that include inorganic conductors and other polymers that are insoluble in non-polar solvents. Also provides methods of forming composite electrolytes using suspensions of polymer microstructures in a processing solvent and the resulting composite electrolytes. These and other aspects of the disclosure are discussed further below.

FIG. 1 is a flow diagram showing operations in a method of forming a composite electrolyte. First in an operation 101, a suspension of polymer microstructures and ionically conductive particles in a liquid is provided. The suspension may be referred to as a suspension slurry. (For the purposes of discussion, the liquid may be referred to as a solvent, however, according to various embodiments, there may or may not be dissolved material in the solvent.) The liquid is one that is compatible with the ionically conductive particles. As described further below, the ionically conductive particles are sulfide particles (e.g., sulfide glass or argyrodite). However, it will be appreciated that the methods described herein may also be used for processing of composites using other types of particles. In the context of a composite electrolyte material, a compatible liquid is one that does not degrade the particles and/or result in a loss of ionic conductivity. For sulfidic particles, this generally means using a non-polar liquid. Solvent polarity may be measured by the polarity index, given below for example solvents. Additional polarity index values are in Christian Reichardt, *Solvents and Solvent Effects in Organic Chemistry*, Wiley-VCH Publishers, 3rd ed., 2003, incorporated by reference herein for the purpose of providing solvents and polarity index values.

Table 1, below, shows the effect of solvent polarity on the stability of sulfidic materials.

TABLE 1

| Effect of solvent polarity on stability of sulfidic materials | | |
|---|---|---|
| Stability of Sulfidic Materials | Polarity Index of Solvent (P) | Example of Solvent (P) |
| Very Unstable | >4.5 | NMP (6.7) |
| | | Acetonitrile (5.8) |
| | | Acetone (5.1) |
| | | Methyl Ethyl Ketone (4.7) |
| | | Methanol (5.1) |
| | | N,N-Dimethylformamide (6.4) |
| | | Dimethyl sulfoxide (7.2) |
| | | 1,4-Dioxane (4.8) |
| Unstable* | >3.5-4.5 | Ethyl Acetate (4.4) |
| | | THF (4.0) |
| | | Chloroform (4.1) |
| | | n-Butyl Alcohol (3.9) |
| | | Butyl acetate (4.0) |
| Stable | 0-3.5 | Dichloromethane (3.1) |
| | | Chlorobenzene (2.7) |
| | | Xylene (2.5) |
| | | Cyclohexane (0.2) |
| | | Pentane (0.0) |
| | | Hexane (0.1) |
| | | Toluene (2.4) |
| | | Heptane (0.1) |

*Sulfidic materials are stable in some solvents in this range including in halogenated solvents such Chloroform Thus, according to various embodiments, the solvent has polarity index of 3.5 or less. The polymer microstructures are provided as a suspension; thus, they are insoluble in the liquid. The polymer microstructures may be, but are not necessarily, polar. Table 2, below, shows examples of polymers that have low solubility in non-polar solvents and may be used in solutions including sulfidic particles. As shown below, these include non-polar solvents.

TABLE 2

| Examples of polymers that may be suspended as microstructures in non-polar liquids | | |
|---|---|---|
| Polymer | Polarity | Solubility |
| Polyoxymethylene (POM) | Polar | Low solubility in non-polar solvents |
| Polyamides (PA): aliphatic polyamides such Nylon-6, Nylon-66, etc.; semi-aromatic polyamides such as polyphthalamides, PA-6T, etc.; aromatics polyamides such as aramids, etc. | Polar | Some, e.g. nylon, low solubility in non-polar solvents |
| Polyaryletherketone such as polyetheretherketone (PEEK), etc. | Polar | Low solubility in non-polar solvents |
| Polyimide (PI) | Polar | Low solubility in non-polar solvents |
| Polyamide-imide (PAI) | Polar | Low solubility in non-polar solvents |

TABLE 2-continued

| Examples of polymers that may be suspended as microstructures in non-polar liquids | | |
|---|---|---|
| Polymer | Polarity | Solubility |
| Polyesters such as polyethylene terephthalate (PET), Polybutylene terephthalate (PBT), Polybutylene adipate terephthalate (PBAT), etc. | Polar | Soluble in some polar solvents; low solubility in some non-polar solvents |
| Poly(vinyl chloride) (PVC) | Polar | Soluble in some polar solvents; low solubility in some non-polar solvents |
| Poly(methyl methacrylate) (PMMA) | Polar | Soluble in some polar solvents; low solubility in some non-polar solvents |
| Cellulose acetate (CA) | Polar | Soluble in some polar solvents; low solubility in some non-polar solvents |
| Polyvinylidene fluoride (PVDF) | Polar | Soluble in some polar solvents; low solubility in non-polar solvents |
| Polyethylene oxide (PEO) | Polar | Soluble in some polar solvents; limited solubility in some non-polar solvents |
| Polypropylene oxide (PPO) | Polar | Soluble in some polar solvents; limited solubility in some non-polar solvents |
| Polysulfone (PSU) | Polar | Soluble in some non-polar solvents; low solubility in some non-polar solvents |
| Polyurethane (PU) | Polar | Soluble in some non-polar and polar solvents |
| Polyethersulfone (PES) | Polar | Soluble in some polar solvents; low solubility in some non-polar solvents |
| Polyetherimide (PEI) | Polar | Soluble in some polar solvents; low solubility in some non-polar solvents |
| Acrylonitrile Butadiene Styrene (ABS) | Polar | Soluble in some polar solvents; low solubility in some non-polar solvents |
| Polycarbonate (PC) | Polar | Soluble in some polar solvents; low solubility in some non-polar solvents |
| Poly(vinyl acetate-co-ethylene) (PVAE) | Polar | Soluble in some polar solvents; low solubility in some non-polar solvents |
| Poly(vinyl alcohol) (PVA) | Polar | Soluble in some non-polar solvents; low solubility in some non-polar solvents |
| Nitrile butadiene rubber (NBR) | Polar | Depends on the amount of nitrile groups - soluble in some non-polar solvents; low solubility in some non-polar solvents. |
| Polyacrylonitrile (PAN) | Polar | Soluble in some polar solvents; low solubility in some non-polar solvents |
| Polypropylene (PP) | Non-polar | Low solubility in non-polar solvents or insoluble in non-polar solvents |
| Polyethylene (PE) | Non-polar | Low solubility in non-polar solvents or insoluble in non-polar solvents |
| Polytetrafluoroethylene (PTFE) | Non-polar | Low solubility in non-polar solvents or insoluble in non-polar solvents |
| Polyphenylene sulfide (PPS) | Non-polar | Low solubility in non-polar solvents or insoluble in non-polar solvents |

It should be noted that while some polymers are listed as having "low solubility," they may be considered "insoluble" for the purposes of being an insoluble microstructure in a solvent. Polymers have varying degrees of solubility in non-polar solvents, and the non-polar solvents (<3.5 polarity index) also have varying degrees of solubility for the polymers listed. For instance, while PMMA is soluble in xylene (polarity index of 2.5), PMMA is not soluble in heptane (polarity index of 0.1). Heptane is used as the solvent in the examples provided below, since the PMMA microspheres do not dissolve in heptane.

Some of the polymers listed in Table 2 are insoluble in all non-polar solvents (for example, PEEK). Such polymers could serve as the first, insoluble polymer of the claims regardless of which non-polar solvent is selected. These polymers are listed as having 'low solubility in non-polar solvents.'

Some of the polymers listed in Table 2 are soluble in some but not all non-polar solvents. These polymers are listed as having 'low solubility in some non-polar solvents.' Such polymers would serve as the first, insoluble polymer only by selection of a non-polar solvent that the polymer is insoluble in.

According to various embodiments, a solvent may be first be selected, with a first polymer that is insoluble in the solvent, and a second polymer that is soluble in the solvent, then selected. Alternatively, one or both of the polymers may first be chosen, with a solvent selected accordingly. Solubility is also dependent on the molecular weight of the polymer, the concentration of the polymer in the solvent, and temperature of the mixture.

For the purpose of this application, a polymer is considered insoluble in a solvent based on the ASTM Standard Test Method for Solubility Range of Resins and Polymers (ASTM D 3132-84). This test can be used to determine whether the polymer will remain insoluble in the solvent used to process the electrolyte film. Mixtures containing the desired solvent and polymer are prepared in clean vials with polymer weight percentages of 0.5 wt %, which represents the minimum concentration that the polymer would be present in during manufacturing conditions. Enough solvent and polymer is added to the vial to allow for reliable visual inspection of the mixture. The vials are closed and mixed continuously at room temperature for 24 hrs. Afterwards, the vials are lined up for observation and allowed to stand for 30 minutes. The vials are then classified as being a complete solution (single, clear phase), borderline solution (cloudy, but without clear phase separation), or insoluble (two clear phases). For solutions that are borderline, the vials is allowed to sit for another 7 days at room temperature before a second observation is performed. If the mixtures are classified as borderline solution or insoluble, than the polymer is not soluble in the non-polar solvent.

For a particular polymer, the solubility can be tested in the following solvents: heptane (very low polarity index of 0.1), xylene (polarity index of 2.5), and 1,2-dichloroethane (polarity index of 3.5). If the polymer is insoluble in at least one of the solvents, then the polymer can serve as the insoluble polymer. This procedure can also be performed with the specific solvent and polymer that are intended to be used for manufacturing of the film.

The polymer microstructures may be chosen for desirable properties in the composite including adhesion to the current collector, flexibility, and mechanical strength. The structures are often spheres but can also be in the form of particles, fibers, or porous sheets. In some embodiments, the structures are microspheres. Microspheres may have a diameter of between 1-5 microns though larger microspheres may be used. In some embodiments, the microstructures have nanoscale dimensions, e.g., spheres with diameters of 100 nm-999 nm, e.g., 100 nm-200 nm. Using small microstructures can help disperse the polymer after melting in subsequent processing and improve the homogeneity of the composite.

The microstructures may be of any appropriate form, including in the form of sheets or fibers. In such cases the thickness of the sheet or fiber may be on the order of 1's of microns or nanoscale, with the length and/or width of the sheet or fiber on the same order, or significantly larger. As described further below, the composites may be in the form of thin films that have thicknesses of 100 microns or less, 50 microns or less, 30 microns or less, or 20 microns or less. The microstructures should be completely within the thickness of the thin film.

The microstructures may be formed by any appropriate method or obtained commercially. In some embodiments, the microstructures may have substantially uniform shape and size distributions. However, the microstructures may also be obtained by precipitating dissolved polymers, which may produce a variety of shapes and sizes.

In some embodiments, the suspension slurry includes a polymer that is soluble in the solvent and compatible with the ionically conductive particles. Using a non-polar polymer may prevent interactions between the polar polymer and the ionically conductive particles and/or prevent crystallization in the ionically conductive polymers. Examples of non-polar polymers include polymers or copolymers including styrene, butadiene, isoprene, ethylene, and butylene. Styrenic block copolymers including polystyrene blocks and rubber blocks may be used, with examples of rubber blocks including polybutadiene (PBD) and polyisoprene (PI). The rubber blocks may or may be hydrogenated. Specific examples of non-polar polymers include copolymers such as styrene-butadiene-styrene (SBS), styrene-isoprene-styrene (SIS), styrene-ethylene/propylene-styrene (SEPS), styrene-ethylene-butylene-styrene (SEBS), styrene butadiene rubber (SBR), ethylene propylene diene monomer (EPDM) rubber, and homopolymers such as polybutadiene (PBD), polyisoprene (PI), and polystyrene (PS).

In some embodiments, an insoluble polymer and a soluble polymer may be provided as a copolymer, with the insoluble polymer forming the suspended microstructures. In some embodiments, the copolymers are block copolymers. Other types of copolymers that have sufficient segregation between the constituent polymers to form microstructures of one polymer may be used as well.

Generally speaking, the polymers are high molecular weight (at least 30 kg/mol) polymers. In some embodiments, it may be at least 50 kg/mol, or at least 100 kg/mol polymer.

As discussed further below, the non-polar polymer may have a melting temperature ($T_m$) or glass transition temperature ($T_g$) that is less than that of the polymer microstructures.

In some embodiments, most of the organic phase of the composite is the polymer provided as a microstructure. This can provide the composite with the desired mechanical properties without regard to solubility in solvents that are compatible with the inorganic material.

In an operation 103, the suspension is dried to obtain a solid phase composite. Prior to drying, the suspension is typically applied to a substrate. Such a substrate may be a battery component such as electrode if the suspension is to be dried in situ or may be a sacrificial substrate used to form a free-standing film. In the latter case, the suspension may be applied to a release film such as Teflon® for later removal.

Figure 2:
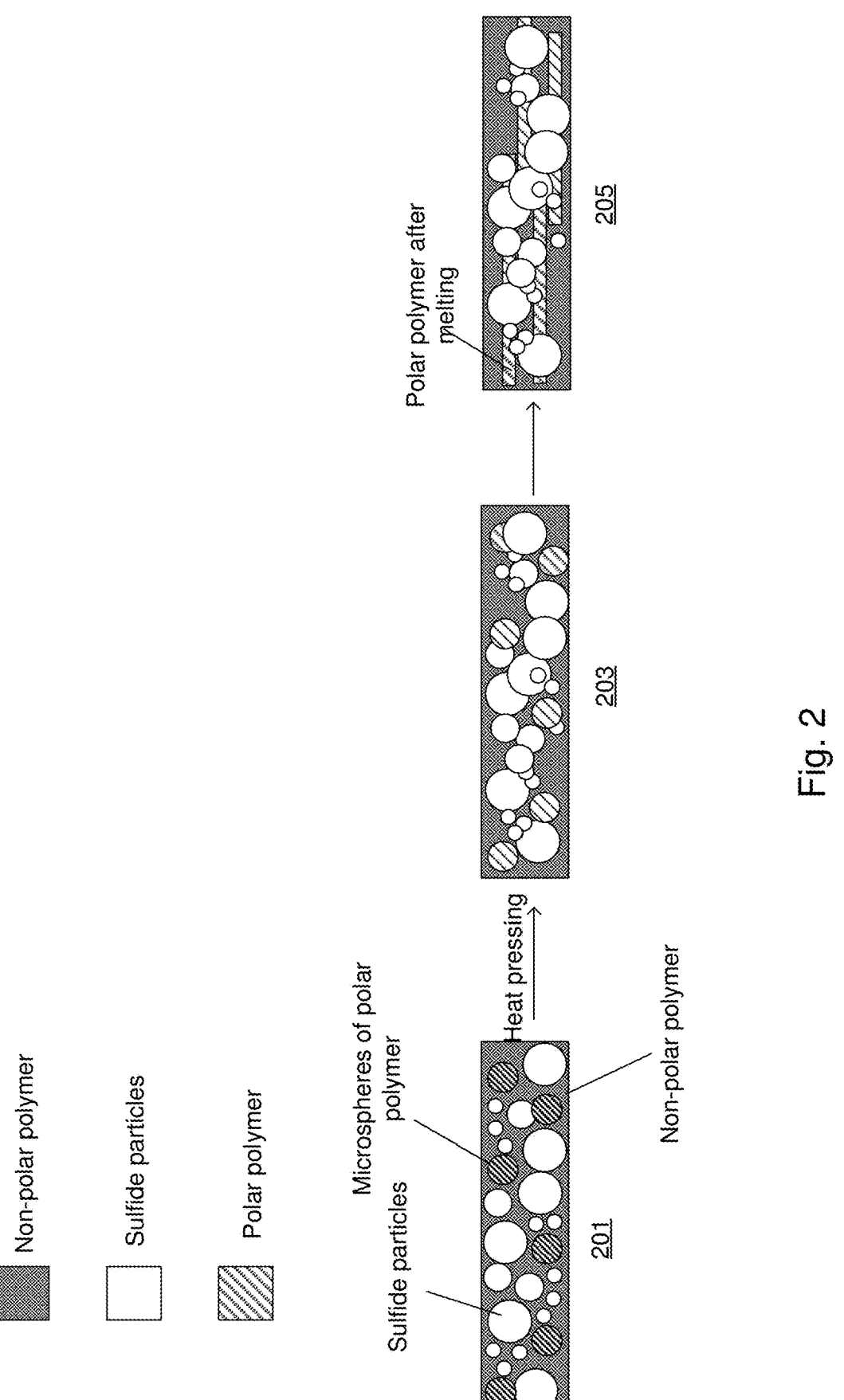
FIG. 2 shows a schematic of a composite according to certain embodiments including polymer microstructures and the ionically conductive particles during certain operations of FIG. 1.

At this stage, the composite includes the polymer microstructures and the ionically conductive particles. In embodiments in which the non-polar polymer is present, the polymer microstructures and ionically conductive particles may be in a matrix or film of the non-polar polymer. FIG. 2 shows an example at 201. Returning to FIG. 1, the composite is pressed in an operation 105. In many embodiments, the composite is heat-pressed, by heating it to a first temperature that is at or above the $T_m$ or $T_g$ of the non-polar polymer and below the $T_m$ or $T_g$ of the polymer microstructures. Relatively low pressures (e.g., 10 MPa) may be used to press the composite. Pressing the composite densifies and creates contact between the particles. Relatively low pressure and heat are sufficient to break the weak interactions between the non-polar polymer (if present) and ionically conductive particles, to generate strong inter-particle ion pathways. An example is illustrated in FIG. 2 at 203. In some embodiments, operation 105 may be omitted.

Next, the composite is heated to melt the polymer microstructures in an operation 107. This results in the loss of shape, and the polymer dispersing in the composite. An example is illustrated at 205 of FIG. 2. In some embodiments, the conductivity of the composite is substantially retained due to conductive inter-particle pathways being previously formed in operation 105.

One or both of operations 105 and 107 may occur after assembly into a device such a battery. For example, the suspension could be cast on an electrode, dried, and assembled into a battery prior to performing operations 105 and 107. Alternatively, operation 105 may be performed prior to assembly of a cell and operation 107 after.

In some embodiments, the insoluble polymer may be non-polar. In such embodiments, it may have a melting temperature or glass transition temperature below the soluble polymer without affecting conductivity.

Inorganic Phase

The inorganic phase of the composite materials described herein conducts alkali ions. In some embodiments, it is responsible for all of the ion conductivity of the composite material, providing ionically conductive pathways through the composite material.

The inorganic phase is a particulate solid-state material that conducts alkali ions. In the examples given below, lithium ion conducting materials are chiefly described, though sodium ion conducting or other alkali ion conducting materials may be employed. According to various embodiments, the materials may be glass particles, ceramic particles, or glass ceramic particles. The methods are particularly useful for composites having glass or glass ceramic particles. In particular, as described above, the methods may be used to provide composites having glass or glass ceramic particles and a polar polymer without inducing crystallization (or further crystallization) of the particles.

The solid-state compositions described herein are not limited to a particular type of compound but may employ any solid-state inorganic ionically conductive particulate material, examples of which are given below.

In some embodiments, the inorganic material is a single ion conductor, which has a transference number close to unity. The transference number of an ion in an electrolyte is the fraction of total current carried in the electrolyte for the ion. Single-ion conductors have a transference number close to unity. According to various embodiments, the transference number of the inorganic phase of the solid electrolyte is at least 0.9 (for example, 0.99).

The inorganic phase may be an oxide-based composition, a sulfide-based composition, or a phosphate-based composition, and may be crystalline, partially crystalline, or amorphous. As described above, the certain embodiments of methods are particularly useful for sulfide-based compositions, which can degrade in the presence of polar polymers.

In certain embodiments, the inorganic phase may be doped to increase conductivity. Examples of solid lithium ion conducting materials include perovskites (e.g., $Li_{3x}La_{(2/3)-x}TiO_3$, $0 \le x \le 0.67$), lithium super ionic conductor (LISICON) compounds (e.g., $Li_{2+2x}Zn_{1-x}GeO_4$, $0 \le x \le 1$; $Li_{14}ZnGe_4O_{16}$), thio-LISICON compounds (e.g., $Li_{4-x}A_{1-y}B_yS_4$, A is Si, Ge or Sn, B is P, Al, Zn, Ga; $Li_{10}SnP_2S_{12}$), garnets (e.g. $Li_7La_3Zr_2O_{12}$, $Li_5La_3M_2O_{12}$, M is Ta or Nb); NASICON-type Li ion conductors (e.g., $Li_{1.3}Al_{0.3}Ti_{1.7}(PO_4)_3$), oxide glasses or glass ceramics (e.g., $Li_3BO_3$—$Li_2SO_4$, $Li_2O$—$P_2O_5$, $Li_2O$—$SiO_2$), argyrodites (e.g. $Li_6PS_5X$ where X=Cl, Br, I), sulfide glasses or glass ceramics (e.g., $75Li_2S$—$25P_2S_5$, $Li_2S$—$SiS_2$, $LiI$—$Li_2S$—$B_2S_3$) and phosphates (e.g., $Li_{1-x}Al_xGe_{2-x}(PO_4)_3$ (LAGP), $Li_{1+x}Ti_{2-x}Al_x(PO_4)$). Further examples include lithium rich anti-perovskite (LiRAP) particles. As described in Zhao and Daement, Jour J. Am. Chem. Soc., 2012, 134 (36), U.S. Plant Pat. No. 15,042-15047, incorporated by reference herein, these LiRAP particles have an ionic conductivity of greater than $10^{-3}$ S/cm at room temperature.

Examples of solid lithium ion conducting materials include sodium super ionic conductor (NASICON) compounds (e.g., $Na_{1+x}Zr_2Si_xP_{3-x}O_{12}$, $0<x<3$). Further examples of solid lithium ion conducting materials may be found in Cao et al., Front. Energy Res. (2014) 2:25 and Knauth, Solid State Ionics 180 (2009) 911-916, both of which are incorporated by reference herein.

Further examples of ion conducting glasses are disclosed in Ribes et al., J. Non-Cryst. Solids, Vol. 38-39 (1980) 271-276 and Minami, J. Non-Cryst. Solids, Vol. 95-96 (1987) 107-118, which are incorporated by reference herein.

According to various embodiments, an inorganic phase may include one or more types of inorganic ionically conductive particles. The particle size of the inorganic phase may vary according to the particular application, with an average diameter of the particles of the composition being between 0.1 μm and 500 μm for most applications. In some embodiments, the average diameter is between 0.1 μm and 100 μm. In some embodiments, a multi-modal size distribution may be used to optimize particle packing. For example, a bi-modal distribution may be used. In some embodiments, particles having a size of 1 μm or less are used such that the average nearest particle distance in the composite is no more than 1 μm. This can help prevent dendrite growth. In some embodiments, average particle size is less 10 μm or less than 7 μm. In some embodiments, a multi-modal size distribution having a first size distribution with an average size of less than 7 μm and a second size of greater than 10 μm may be used. Larger particles lead to membranes with more robust mechanical properties and better conductivities, while smaller particles give more compact, uniform films with lower porosity and better density.

The inorganic phase may be manufactured by any appropriate method. For example, crystalline materials may be obtained using different synthetic methods such as solution, sol-gel, and solid-state reactions. Glass electrolytes may be obtained by quench-melt, solution synthesis or mechanical milling as described in Tatsumisago, M.; Takano, R.; Tadanaga K.; Hayashi, A. J. Power Sources 2014, 270, 603-607, incorporated by reference herein.

As used herein, the term amorphous glass material refers to materials that are at least half amorphous though they may have small regions of crystallinity. For example, an amorphous glass particle may be fully amorphous (100% amorphous), at least 95% (vol). amorphous, at least 80% (vol.) amorphous, or at least 75% (vol.) amorphous. While these amorphous particles may one or more small regions of crystallinity, ion conduction through the particles is through conductive paths that are mostly or wholly isotropic.

Ionically conductive glass-ceramic particles have amorphous regions but are at least half crystalline, for example, having at least 75% (vol.) crystallinity. Glass-ceramic particles may be used in the composites described, herein, with glass-ceramic particles having a relatively high amount of amorphous character (e.g., at least 40 (vol) % amorphous) useful in certain embodiments for their isotropic conductive paths. In some embodiments, ionically conductive ceramic particles may be used. Ionically conductive ceramic particles refer to materials that are mostly crystalline though they may have small amorphous regions. For example, a ceramic particle may be fully crystalline (100% vol. crystalline) or at least 95% (vol). crystalline.

In some embodiments, the inorganic phase includes argyrodites. The mineral Argyrodite, $Ag_8GeS_6$, can be thought of as a co-crystal of $Ag_4GeS_4$ and two equivalents of $Ag_2S$. Substitutions in both cations and anions can be made in this crystal while still retaining the same overall spatial arrangement of the various ions. In $Li_7PS_6$, $PS_4^{3-}$ ions reside on the crystallographic location occupied by $GeS_4^{4-}$ in the original mineral, while $S^{2-}$ ions retain their original positions and $Li^+$ ions take the positions of the original $Ag^+$ ions. As there are fewer cations in $Li_7PS_6$ compared to the original $Ag_8GeS_6$, some cation sites are vacant. These structural analogs of the original Argyrodite mineral are referred to as argyrodites as well.

Both $Ag_8GeS_6$ and $Li_7PS_6$ are orthorhombic crystals at room temperature, while at elevated temperatures phase transitions to cubic space groups occur. Making the further substitution of one equivalent of LiCl for one $Li_2S$ yields the material $Li_6PS_5Cl$, which still retains the argyrodite structure but undergoes the orthorhombic to cubic phase transition below room temperature and has a significantly higher lithium-ion conductivity. Because the overall arrangement of cations and anions remains the same in this material as well, it is also commonly referred to as an argyrodite. Further substitutions which also retain this overall structure may therefore also be referred to as argyrodites. Alkali metal argyrodites more generally are any of the class of conductive crystals with alkali metals occupying $Ag+$ sites in the original Argyrodite structure, and which retain the spatial arrangement of the anions found in the original mineral. In one example, a lithium-containing example of this mineral type, $Li_7PS_6$, $PS_4^{3-}$ ions reside on the crystallographic location occupied by $GeS_4^{4-}$ in the original mineral, while $S^{2-}$ ions retain their original positions and $Li^+$ ions take the positions of the original $Ag^+$ ions. As there are fewer cations in $Li_7PS_6$ compared to the original $Ag_8GeS_6$, some cation sites are vacant. Making the further substitution of one equivalent of LiCl for one $Li_2S$ yields the material $Li_6PS_5Cl$, which still retains the argyrodite structure. There are various manners in which substitutions may be made that retain the overall argyrodite structure. For example, the original mineral has two equivalents of $S^{2-}$, which can be substituted with chalcogen ions such as $O^{2-}$, $Se^{2-}$, and $Te^{2-}$. A significant fraction of the of $S^{2-}$ can be substituted with halogens. For example, up to about 1.6 of the two equivalents of $S^{2-}$ can be substituted with $Cl^-$, $Br^-$, and $I^{-1}$, with the exact amount depending on other ions in the system. While $Cl^-$ is similar in size to $S^{2-}$, it has one charge instead of two and has fairly different bonding and reactivity properties. Other substitutions may be made, for example, in some cases, some of the $S^{2-}$ can be substituted with a halogen (e.g., $Cl^-$) and the rest replaced with $Se^{2-}$. Similarly, various substitutions may be made for the $GeS_4^{3-}$ sites. $PS_4^{3-}$ may replace $GeS_4^{3-}$; also $PO_4^{3-}$, $PSe_4^{3-}$, $SiS_4^{3-}$, etc. These are all tetrahedral ions with four chalcogen atoms, overall larger than $S^{2-}$, and triply or quadruply charged.

In some embodimets, the argyrodites may have the formula:

$$A_{7-x}PS_{6-x}Hal_x$$

A is an alkali metal and Hal is selected from chlorine (Cl), bromine (Br), and iodine (I).

In some embodiments, the argyrodite may have a general formula as given above, and further be doped. An example is argyrodites doped with thiophilic metals:

$$A_{7-x-(z*m)}M^z_mPS_{6-x}Hal_x$$

wherein A is an alkali metal; M is a metal selected from manganese (Mn), iron (Fe), cobalt (Co), nickel (Ni), copper (Cu), zinc (Zn), and mercury (Hg); Hal is selected from chlorine (Cl), bromine (Br), and iodine (I); z is the oxidation state of the metal; $0 \leq x \leq 2$; and $0 \leq m < (7-x)/z$. In some embodiments, A is lithium (Li), sodium (Na) or potassium (K). In some embodiments, A is Li. Metal-doped argyrodites are described further in U.S. Provisional Patent Application No. 62/888,323, incorporated by reference herein. In some embodiments, the composite may include oxide argyrodites, for example, as described in U.S. patent application Ser. No. 16/576,570, incorporated by reference herein.

Alkali metal argyrodites more generally are any of the class of argyrodite-like conductive crystals of with cubic symmetry that include an alkali metal. This includes argyrodites of the formulae given above as well as argyrodites described in US Patent Publication No. 20170352916 which include $Li_{7-x+y}PS_{6-x}Cl_{x+y}$ where x and y satisfy the formula $0.05 \leq y \leq 0.9$ and $-3.0x+1.8 \leq y \leq -3.0x+5$, or other argyrodites with $A_{7-x+y}PS_{6-x}Hal_{x+y}$ formula. Such argyrodites may also be doped with metal as described above, which include $A_{7-x+y-(z*m)}M^z_mPS_{6-x}Hal_{x+y}$.

Composites

Provided herein are composites including organic phase and non-ionically conductive particles. In some embodiments, the organic phase has substantially no ionic conductivity, and is referred to as "non-ionically conductive." Non-ionically conductive polymers described herein have ionic conductivities of less than 0.0001 S/cm. In some embodiments, the organic phase may include a polymer that is ionically conductive in the present of a salt such as LiI. Ionically conductive polymers such as polyethylene oxide (PEO), polypropylene oxide (PPO), polyacrylonitrile (PAN), poly(methyl methacrylate) (PMMA), which are ionically conductive dissolve or dissociate salts such as LiI. Non-ionically conductive polymers do not dissolve or dissociate salts and are not ionically conductive even in the presence of a salt. This is because without dissolving a salt, there are no mobile ions to conduct.

The polymer loading in the solid phase composites may be relatively high in some embodiments, e.g., being at least 2.5%-30% by weight. According to various embodiments, it may between 0.5 wt %-60 wt % polymer, 1 wt %-40 wt % polymer, or 5 wt %-30 wt %. The solid phase composites form a continuous film.

As indicated above, in some embodiments, the composite contains a non-polar polymer that is soluble in a non-polar solvent and a polymer that is insoluble in the non-polar solvent. The non-polar solvent may have a polarity index of between 0 and 3.5 in some embodiments. Solvents with higher polarity indexes may be used as well if the sulfide electrolytes are stable therein. An example is chloroform, which has a polarity index of 4.1. Other halogenated solvents may also be used. In some such embodiments, the insoluble polymer is polar. In some embodiments, the insoluble polymer is a higher wt. % in the composite than the non-polar polymer. In this manner, the composite will have mechanical properties of the polar polymer with sufficient non-polar polymer to maintain conductivity. In some embodiments, for example, less than 5 wt. % of a solid phase composite may be a non-polar polymer. In some embodiments, this may be less than 4 wt. %, less than 3 wt. %, less than 2 wt. %, or less than 1 wt %. Most of or in some embodiments, essentially all, of the remaining polymer is the polar polymer or other insoluble polymer. According to various embodiments, at least 50.1 wt % and up to 98 wt % of the organic phase may be insoluble polymer.

In some embodiments, the solid-phase composites consist essentially of ion-conductive inorganic particles and an organic phase. However, in alternative embodiments, one or more additional components may be added to the solid composites.

According to various embodiments, the solid compositions may or may not include an added salt. Lithium salts (e.g., LiPF6, LiTFSI), potassium salts, sodium salts, etc. can be added to improve ionic conductivity in embodiments that include an ionically conductive polymer such as PEO. In some embodiments, the solid-state compositions include substantially no added salts. "Substantially no added salts" means no more than a trace amount of a salt. In some embodiments, the ionic conductivity of the composite is substantially provided by the inorganic particles. Even if an ionically conductive polymer is used, it may not contribute more than 0.01 mS/cm, 0.05 mS/cm. or 0.1 mS/cm to the ionic conductivity of the composite. In other embodiments, it may contribute more.

In some embodiments, the solid-state composition may include one or more conductivity enhancers. In some embodiments, the electrolyte may include one or more filler materials, including ceramic fillers such as $Al_2O_3$. If used, a filler may or may not be an ion conductor depending on the particular embodiment. In some embodiments, the composite may include one or more dispersants. Further, in some embodiments, an organic phase of a solid-state composition may include one or more additional organic components to facilitate manufacture of an electrolyte having mechanical properties desired for a particular application.

In some embodiments, discussed further below, the composites are incorporated into, or are ready to be incorporated into, an electrode and include electrochemically active material, and optionally, an electronically conductive additive. Examples of constituents and compositions of electrodes are provided below.

In some embodiments, the electrolyte may include an electrode stabilizing agent that can be used to form a passivation layer on the surface of an electrode. Examples of electrode stabilizing agents are described in U.S. Pat. No.

9,093,722. In some embodiments, the electrolyte may include conductivity enhancers, fillers, or organic components as described above.

The composite may be provided as a free-standing film, a free-standing film that is provided on a release film, a film that has been laminated on component of a battery or other device such as an electrode or a separator, or a film that has been cast onto an electrode, separator, or other component.

A composite film may be of any suitable thickness depending upon the particular battery or other device design. For many applications, the thickness may be between 1 micron and 250 microns, for example 30 microns. In some embodiments, the electrolyte may be significantly thicker, e.g., on the order of millimeters.

In some embodiments, the composites are provided as a slurry or paste. In such cases, the composition includes a solvent to be later evaporated. This is often the same solvent as described above. In addition, the composition may include one or more components for storage stability. Such compounds can include an acrylic resin. Once ready for processing the slurry or paste may be cast or spread on a substrate as appropriate and dried.

In some embodiments, the composites are provided as solid mixtures that can be extruded. For electrodes, the solid mixtures include one or more additional materials as described further below.

Also provided are solutions including a solvent having polymer microstructures suspended therein and a polymer dissolved therein. Such solutions may be mixed with ionically conductive particles.

Also provided are composites including lithium argyrodites and polar polymers. As described in the Example embodiments below, lithium argyrodites do not suffer the same conductivity losses as sulfide glasses when processed with pre-dissolved polar polymers in slurry-based processing. Thus, in some embodiments, methods may involve dissolving polar polymer in a solvent with argyrodite to form a slurry, coating the slurry, and drying the composite. This may be followed by a hot press. Slurry-based processing and hot pressing can provide high conductivity. The solvent may be a non-polar solvent. There may or may not be a non-polar polymer in the composite.

Devices

The composites described herein may be incorporated into any device that uses an ionic conductor, including but not limited to batteries and fuel cells. In a battery, for example, the composite may be used as an electrolyte separator.

The electrode compositions further include an electrode active material, and optionally, a conductive additive. Example cathode and anode compositions are given below.

For cathode compositions, the table below gives examples of compositions.

| Constituent | Active material | Inorganic conductor | Electronic conductivity additive | Organic phase |
|---|---|---|---|---|
| Examples | Transition Metal Oxide | Agyrodites (e.g., $Li_6PS_5Cl$, | Carbon-based | PVDF and SEBS |
| | Transition Metal | $Li_{5.6}PS_{4.6}Cl_{1.4}$, | Activated carbons | PMMA and SEBS |
| | Oxide with layer | $Li_{5.4}M_{0.1}PS_{4.6}Cl_{1.4}$, | | Nylon and SEBS |
| | structure | $Li_{5.8}M_{0.1}PS_5Cl$, | CNTs | PMMA |
| | NMC | $Na_{5.8}M_{0.1}PS_5Cl$ | Graphene | PVDF |
| | | | Graphite | PS-PVDF |

-continued

| Constituent | Active material | Inorganic conductor | Electronic conductivity additive | Organic phase |
|---|---|---|---|---|
| | | Sulfide glasses or glass ceramics (e.g., $75Li_2S \cdot 25P_2S_5$) | Carbon fibers Carbon black (e.g., Super C) | PVDF grafted with PS NBR Grafted SEBS with polar polymer blocks |
| Wt % range | 65%-88% | 10%-33% | 1%-5% | 1%-5% |

According to various embodiments, the cathode active material is a transition metal oxide, with lithium nickel cobalt manganese oxide ($LiMnCoMnO_2$, or NMC) an example. Various forms of NMC may be used, including $LiNi_{0.6}Mn_{0.2}Co_{0.2}O_2$ (NMC-622), $LiNi_{0.4}Mn_{0.3}Co_{0.3}O_2$ (NMC-4330), etc. The lower end of the wt % range is set by energy density; compositions having less than 65 wt % active material have low energy density and may not be useful.

Any appropriate inorganic conductor may be used as described above in the description of inorganic conductors. $Li_{5.6}PS_{4.6}Cl_{1.4}$ is an example of an argyrodite with high conductivity. $Li_{5.4}Cu_{0.1}PS_{4.6}Cl_{1.4}$ is an example of an argyrodite that retains high ionic conductivity and suppresses hydrogen sulfide. Compositions having less than 10 wt % argyrodite have low $Li^+$ conductivity. Sulfide glasses and glass ceramics may also be used.

An electronic conductivity additive is useful for active materials that, like NMC, have low electronic conductivity. Carbon black is an example of one such additive, but other carbon-based additives including other carbon blacks, activated carbons, carbon fibers, graphites, graphenes, and carbon nanotubes (CNTs) may be used. Below 1 wt % may not be enough to improve electronic conductivity while greater than 5% leads to decrease in energy density and disturbing active material-argyrodite contacts.

Any appropriate organic phase may be used as described above. Below 1 wt % may not be enough to achieve desired mechanical properties while greater than 5% can lead to decrease in energy density and disturbing active material-inorganic conductor-carbon contacts. In some embodiments, PVDF is used with or without a non-polar polymer.

For anode compositions, the table below gives examples of compositions.

irreversible capacity loss on the first cycle. Graphite has high ICE (e.g., greater than 90%) enabling full capacity utilization. Hybrid anodes where both Si and graphite are utilized as active materials deliver higher ICE with increasing graphite content meaning that ICE of the anode can match ICE of the cathode by adjusting Si/graphite ratio thus preventing irreversible capacity loss on the first cycle. ICE can vary with processing, allowing for a relatively wide range of graphite content depending on the particular anode and its processing. In addition, graphite improves electronic conductivity and may help densification of the anode.

Any appropriate inorganic conductor may be used as described above with respect to cathodes.

A high-surface-area electronic conductivity additive (e.g., carbon black) may be used some embodiments. Si has low electronic conductivity and such additives can be helpful in addition to graphite (which is a great electronic conductor but has low surface area). However, electronic conductivity of Si alloys can be reasonably high making usage of the additives unnecessary in some embodiments. Other high-surface-area carbons (carbon blacks, activated carbons, graphenes, carbon nanotubes) can also be used instead of Super C.

Any appropriate organic phase may be used. In some embodiments, PVDF is used with or without a non-polar polymer.

Provided herein are alkali metal batteries and alkali metal ion batteries that include an anode, a cathode, and a compliant solid electrolyte composition as described above operatively associated with the anode and cathode. The batteries may include a separator for physically separating the anode and cathode; this may be the solid electrolyte composition.

| Constituent | Primary active material | Secondary active material | Inorganic conductor | Electronic conductivity additive | Organic phase |
|---|---|---|---|---|---|
| Examples | Si-containing Elemental Si Si alloys, e.g., Si alloyed with one or more of Al, Zn, Fe, Mn, Cr, Co, Ni, Cu, Ti, Mg, Sn, Ge | Graphite | Agyrodites (e.g., $Li_6PS_5Cl$, $Li_{5.6}PS_{4.6}Cl_{1.4}$, $Li_{5.4}M_{0.1}PS_{4.6}Cl_{1.4}$, $Li_{5.8}M_{0.1}PS_5Cl$, $Na_{5.8}M_{0.1}PS_5Cl$ Sulfide glasses or glass ceramics (e.g., $75Li_2S \cdot 25P_2S_5$) | Carbon-based Activated carbons CNTs Graphene Carbon fibers Carbon black (e.g., Super C) | Hydrophobic block copolymers having soft and hard blocks SEBS NBR PVdF PS-PVDF PVDF grafted with PS Grafted SEBS with polar polymer blocks |
| Wt % range | Si is 15%-50% | 5%-40% | 10%-60% | 0%-5% | 1%-5% |

Graphite can be used as a secondary active material to improve initial coulombic efficiency (ICE) of the Si anodes. Si suffers from low ICE (e.g., less than 80% in some cases) which is lower than ICE of NMC and other cathodes causing Examples of suitable anodes include but are not limited to anodes formed of lithium metal, lithium alloys, sodium metal, sodium alloys, carbonaceous materials such as graphite, and combinations thereof. Examples of suitable cathodes include but are not limited to cathodes formed of transition metal oxides, doped transition metal oxides, metal phosphates, metal sulfides, lithium iron phosphate, sulfur and combinations thereof. In some embodiments, the cathode may be a sulfur cathode.

In an alkali metal-air battery such as a lithium-air battery, sodium-air battery, or potassium-air battery, the cathode may be permeable to oxygen (e.g., mesoporous carbon, porous aluminum, etc.), and the cathode may optionally contain a metal catalyst (e.g., manganese, cobalt, ruthenium, platinum, or silver catalysts, or combinations thereof) incorporated therein to enhance the reduction reactions occurring with lithium ion and oxygen at the cathode.

In some embodiments, lithium-sulfur cells are provided, including lithium metal anodes and sulfur-containing cathodes. In some embodiments, the solid-state composite electrolytes described herein uniquely enable both a lithium metal anode, by preventing dendrite formation, and sulfur cathodes, by not dissolving polysulfide intermediates that are formed at the cathode during discharge.

A separator formed from any suitable material permeable to ionic flow can also be included to keep the anode and cathode from directly electrically contacting one another. However, as the electrolyte compositions described herein are solid compositions, they can serve as separators, particularly when they are in the form of a film.

In some embodiments, the solid electrolyte compositions serve as electrolytes between anodes and cathodes in alkali ion batteries that rely on intercalation of the alkali ion during cycling.

As described above, in some embodiments, the solid composite compositions may be incorporated into an electrode of a battery. The electrolyte may be a compliant solid electrolyte as described above or any other appropriate electrolyte.

In some embodiments, a battery includes an electrode/electrolyte bilayer, with each layer incorporating the ionically conductive solid-state composite materials described herein.

FIG. 3A shows an example of a schematic of a cell according to certain embodiments of the invention. The cell includes a negative current collector 302, an anode 304, an electrolyte/separator 306, a cathode 308, and a positive current collector 310. The negative current collector 302 and the positive current collector 310 may be any appropriate electronically conductive material, such as copper, steel, gold, platinum, aluminum, and nickel. In some embodiments, the negative current collector 302 is copper and the positive current collector 310 is aluminum. The current collectors may be in any appropriate form, such as a sheet, foil, a mesh, or a foam. According to various embodiments, one or more of the anode 304, the cathode 308, and the electrolyte/separator 306 is a solid-state composite including an organic phase and sulfide conductor as described above. In some embodiments, two or more of the anode 304, the cathode 308, and the electrolyte 306 are solid-state composites including an organic phase and sulfide conductor, as described above.

In some embodiments, a current collector is a porous body that can be embedded in the corresponding electrode. For example, it may be a mesh. Electrodes that include hydrophobic polymers may not adhere well to current collectors in the form of foils; however, meshes provide good mechanical contact. In some embodiments, two composite films as described herein may be pressed against a mesh current collector to form an embedded current collector in an electrode. In some embodiments, a hydrophilic polymer is used that provides good adhesion is used.

FIG. 3B shows an example of schematic of a lithium metal cell as-assembled according to certain embodiments of the invention. The cell as-assembled includes a negative current collector 302, an electrolyte/separator 306, a cathode 308, and a positive current collector 310. Lithium metal is generated on first charge and plates on the negative current collector 302 to form the anode. One or both of the electrolyte 306 and the cathode 308 may be a composite material as described above. In some embodiments, the cathode 308 and the electrolyte 306 together form an electrode/electrolyte bilayer. FIG. 3C shows an example of a schematic of a cell according to certain embodiments of the invention. The cell includes a negative current collector 302, an anode 304, a cathode/electrolyte bilayer 312, and a positive current collector 310. Each layer in a bilayer may include a sulfidic conductor. Such a bilayer may be prepared, for example, by preparing an electrolyte slurry and depositing it on an electrode layer.

All components of the battery can be included in or packaged in a suitable rigid or flexible container with external leads or contacts for establishing an electrical connection to the anode and cathode, in accordance with known techniques.

Example Embodiments

Composites thin film electrolytes having a blend of SEBS and PMMA or SEBS and Nylon as binders were prepared.

Composite 1: $75Li_2S \cdot 25P_2S_5$ glass (90 wt. %) and SEBS (10 wt. %)

Composite 2: $75Li_2S \cdot 25P_2S_5$ glass (90 wt. %), SEBS (2 wt. %) and PMMA (8 wt. %)

Composite 3: $75Li_2S \cdot 25P_2S_5$ glass (90 wt. %), SEBS (2 wt. %) and PMMA microspheres (8 wt. %)

Composite 4: $Li_{5.6}PS_{4.6}Cl_{1.4}$ (90 wt. %), SEBS (2 wt. %) and PMMA microspheres (8 wt. %)

Composite 5: $Li_{5.6}PS_{4.6}Cl_{1.4}$ (90 wt. %), SEBS (2 wt. %) and PMMA (8 wt. %)

Composite 6: $Li_{5.6}PS_{4.6}Cl_{1.4}$ (90 wt. %), SEBS (2 wt. %) and Nylon-12 microspheres (8 wt. %)

Sulfide conductive particles ($75Li_2S \cdot 25P_2S_5$ or $Li_{5.6}PS_{4.6}Cl_{1.4}$) were added to the small thinky cup with non-polar polymer (SEBS, $T_g=120°$ C.) and polar polymer (PMMA, $T_m=160°$ C.) or polar polymer microspheres (PMMA microspheres with a particle size of 6 µm and $T_m=160°$ C. or Nylon microspheres with a particles size of 5 µm and $T_m=180°$ C.). The solvent used was heptane (in which PMMA is insoluble) for the composites 1, 3, 4 and 6. For the composites 2 and 5, xylene (which dissolves PMMA) was used as solvent. Finally, eight balls of zirconia were added to each composite and they were mixed in the roll mixer at 80 rpm, room temperature and overnight.

A tabletop coater and a doctor blade were used to get the composite membranes. The substrate was a teflon film. The composite membranes were allowed to dry on the coating plate. They were then placed into a big vacuum chamber where they were dried overnight. The heat-pressing conditions were: 24 tons at 170° C. for 1 h for composites 1, 2, 3, 4, and 5 and 24 tons at 210° C. for 1 h for composite 6. The conductivity of the composite membranes is reported in Tables 3-5 below.

TABLE 3

Conductivity measured for composites with 90 wt. % 75Li$_2$S•25P$_2$S$_5$
glass and SEBS or SEBS/PMMA binders processed by different methods

| Composite ID | Sulfide electrolyte | SEBS wt. % in composite | PMMA wt. % in composite, pre-dissolved | PMMA wt. % microspheres | Hot press conditions | $\sigma_{film}$ (mS/cm) |
|---|---|---|---|---|---|---|
| 1 | 75Li$_2$S•25P$_2$S$_5$ | 10 wt. % | — | — | 170° C., 1 hr | 0.38 |
| 2 | | 2 wt. % | 8 wt. % | — | 170° C., 1 hr | .0026 |
| 3 | | 2 wt. % | — | 8 wt. % | 170° C., 1 hr | .39 |

The results in Table 3 show that the morphology of a polar binder during processing has tremendous effect on transport properties of resulting composites with sulfide glasses. The conductivity of composite 3 (PMMA microspheres as binder) is two orders higher than the composite 2 (pre-dissolved PMMA as binder).

TABLE 4

Conductivity measured for composites with 90 wt. % Li$_{5.6}$PS$_{4.6}$Cl$_{1.4}$
argyrodite and SEBS/PMMA binders deposited at different conditions

| Composite ID | Sulfide electrolyte | SEBS wt. % in composite | PMMA wt. % in composite, pre-dissolved | PMMA wt. % microspheres | Hot press conditions | $\sigma_{film}$ (mS/cm) |
|---|---|---|---|---|---|---|
| 4 | Li$_{5.6}$PS$_{4.6}$Cl$_{1.4}$ | 2 wt. % | — | 8 wt. % | 170° C., 1 hr | 0.44 |
| 5 | | 2 wt. % | 8 wt. % | — | 170° C., 1 hr | 0.33 |

Composite electrolyte 4 (argyrodites and PMMA microspheres) shows 25% higher conductivity than composite 5 (argyrodites and pre-dissolved PMMA binder). Notably the conductivity retention of the argyrodite-containing composite 5, while lower than that processed using PMMA microspheres, is significantly higher than the sulfide glass containing composite 2. This indicates that the argyrodites may be processed with dissolved polar binders (with or without non-polar polymers) in slurry-based processing. This is beneficial as slurry-based processing can provide higher particle-to-particle contact and thus higher conductivity than dry processing. The high conductivity observed in composite 5 may be a result of using argyrodites (which do not suffer the conductivity losses that sulfide glasses do with dissolved polar binders), the slurry-based process (which results in higher conductivities than dry coating), and hot pressing. Further description of composites including argyrodites and polar polymer binders is in U.S. patent application Ser. No. 17/129,290 incorporated by reference herein for all purposes.

TABLE 5

Conductivity measured for composite with 90 wt. %
Li$_{5.6}$PS$_{4.6}$Cl$_{1.4}$ argyrodite and SEBS/Nylon-12 binder

| Composite ID | Sulfide electrolyte | SEBS wt. % in composite | Nylon-12 microspheres, wt. % | Hot press conditions | $\sigma_{film}$ (mS/cm) |
|---|---|---|---|---|---|
| 6 | Li$_{5.6}$PS$_{4.5}$Cl$_{1.4}$ | 2 wt. % | 8 wt. % | 210° C., 1 hr | 0.32 |

Composite 6 based on argyrodite and microspheres of nylon-12, a polar polymer with very low solubility, leads to high conductivity as well.

Table 6 below summarizes composites prepared with 5 wt. % binders (95 wt. % argyrodite) with increasing polarity, SEBS functionalized with maleic anhydride (SEBS-gMA), NBR$_{20}$ (20% nitrile groups) and poly (vinyl acetate) (PVAc), that show conductivities between about 0.5 mS/cm and 0.7 mS/cm. There is a drop in conductivities of composites with more polar binders, but it is not as drastic as in case of glasses. Produced composites maintain good conductivities, while having better mechanical properties.

TABLE 6

Conductivity of argyrodite-containing composites

| Conductor composition | Polymer binder | Conductivity at 25° C. /mS · cm$^{-1}$ |
|---|---|---|
| Li$_{5.6}$PS$_{1.4}$Cl$_{1.4}$ | SEBS-gMA | 0.705 |
| | NBR$_{20}$ | 0.606 |
| | PVAc | 0.508 |

CONCLUSION

The foregoing describes the instant invention and its certain embodiments. Numerous modifications and variations in the practice of this invention are expected to occur to those skilled in the art. For example, while the above specification describes electrolytes and electrodes for alkali ion or alkali metal batteries, the compositions described may be used in other contexts. Further, the batteries and battery components described herein are no limited to particular cell designs. Such modifications and variations are encompassed within the following claims.

The invention claimed is:

1. A composite comprising:

ionically conductive lithium argyrodite particles and a polymer binder comprising a first polymer and a second polymer, wherein the first polymer is insoluble in a non-polar solvent, the second polymer is soluble in the non-polar solvent, and the first polymer has a melting temperature ($T_m$) or a glass transition temperature ($T_g$) greater than a $T_m$ or $T_g$ of the second polymer, and wherein the composite has an ionic conductivity of at least 0.3 mS/cm and wherein the first and second polymers are provided as a first copolymer.

2. The composite of claim 1, wherein the weight percent of the first polymer in the composite is greater that the weight percent of the second polymer in the composite.

3. The composite of claim 1, wherein the non-polar solvent has a polarity index of less than 3.5.

4. The composite of claim 1, wherein the non-polar solvent has a polarity index of less than 3.0.

5. The composite of claim 1, wherein the weight percent of the polymer binder in the composite is between 2.5% and 60%.

6. The composite of claim 1, wherein the weight percent of the polymer binder in the composite is between 15% and 45%.

7. The composite of claim 6, wherein the balance of the composite consists essentially of the ionically conductive lithium argyrodite particles.

8. The composite of claim 1, wherein the polymer binder consists essentially of the first polymer and the second polymer.

9. The composite of claim 1, wherein the composite is a separator in a battery.

10. A composite comprising:

ionically conductive lithium argyrodite particles and a polymer binder comprising a first polymer, wherein the first polymer is insoluble in a first non-polar solvent and soluble in a second non-polar solvent wherein the composite has an ionic conductivity of at least 0.3 mS/cm and wherein the first and second polymers are provided as a first copolymer.

* * * * *